United States Patent [19]
Kuczynski

[11] Patent Number: 5,146,056
[45] Date of Patent: Sep. 8, 1992

[54] SNAP-IN BRACKET FOR CIRCUIT BREAKER

[76] Inventor: Robert A. Kuczynski, 520 Springfield Ave., Westfield, N.J. 07090

[21] Appl. No.: 692,712

[22] Filed: Apr. 29, 1991

[51] Int. Cl.⁵ .......................... H01H 9/02; G12B 9/00
[52] U.S. Cl. .................................... 200/296; 200/295; 248/27.3
[58] Field of Search .................. 200/296, 295, 294; 248/27.1, 27.3

[56] References Cited

U.S. PATENT DOCUMENTS

| | | | |
|---|---|---|---|
| 2,605,374 | 7/1952 | Batcheller | 200/295 X |
| 2,687,862 | 8/1954 | Crowther | 248/27.3 |
| 3,213,189 | 10/1965 | Mitchell et al. | 248/27.1 |
| 4,080,522 | 3/1978 | Schimmels | 200/296 X |
| 4,163,136 | 7/1979 | Piber | 200/296 |
| 4,211,905 | 7/1980 | Quigley | 200/296 |
| 4,687,164 | 8/1987 | Bakhaus et al. | 200/296 X |
| 4,778,965 | 10/1988 | Valenzona | 200/296 |
| 4,840,584 | 6/1989 | Cox | 248/27.3 |

FOREIGN PATENT DOCUMENTS 1080654  4/1960  Fed. Rep. of Germany ...... 200/296

Primary Examiner—Ernest G. Cusick
Assistant Examiner—David J. Walczak
Attorney, Agent, or Firm—Lerner, David, Littenberg, Krumholz & Mentlik

[57] ABSTRACT

A improved snap-in bracket for supporting an electronic component in an opening in a support panel has, a cylindrical body disposed for friction-fit or ultrasonically welded engagement with the electronic component, holding members hingedly connected on diametrically opposing sides of the cylindrical body, locking tabs operatively associated with the holding members, and resilient fingers medially connected at opposite sides of a cylindrical body and at a predetermined spaced distance from the holding members. When the snap-in bracket is in assembled position, the holding members are disposed to engage the upper face of the support panel about the opening therein to exert a downward force upon the upper face, and the resilient fingers are disposed to engage the lower face of the panel about the opening therein and exert an upward force thereon opposite to the two forces exerted by the holding members for operative coaction therewith to detachably fix and maintain the snap-in bracket in assembled position. Further, the locking tabs are positioned within the opening in the support panel and exert a force upon the wall of the opening with a magnitude directly proportional to the magnitude of external forces that may be exerted against the snap-in bracket to effectively prevent deformation of the holding members when the snap-in bracket is in assembled position. Additionally, the improved snap-in bracket as above described, wherein the improved snap-in bracket and the electronic component are manufactured as an integral unit to be detachably fixed and maintained in the opening in the support panel.

13 Claims, 5 Drawing Sheets

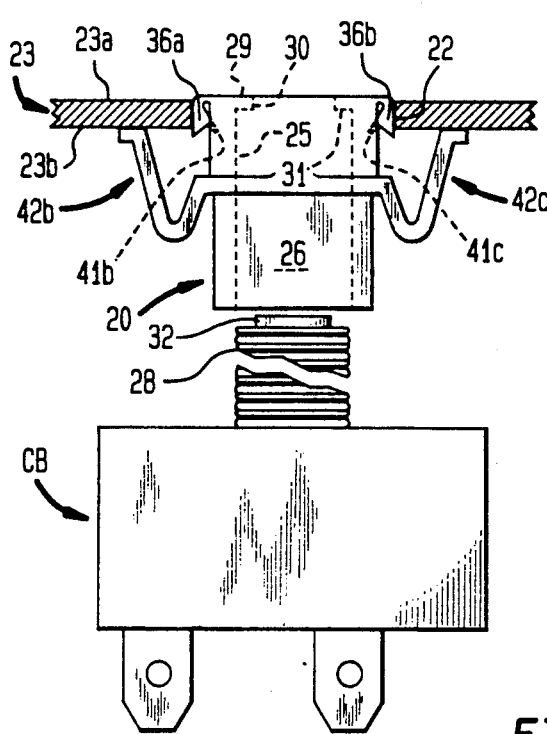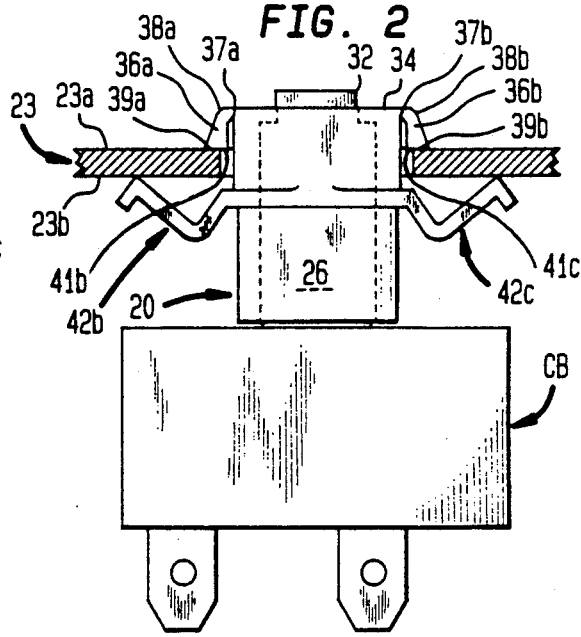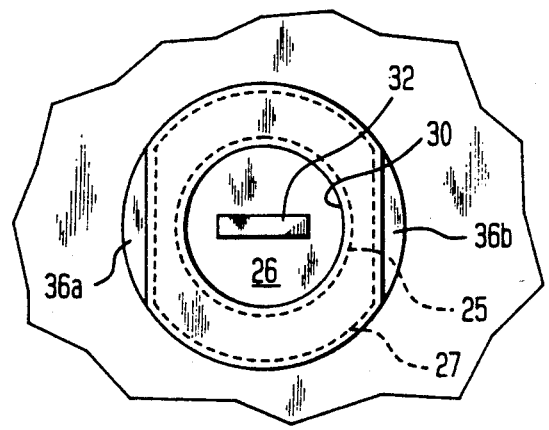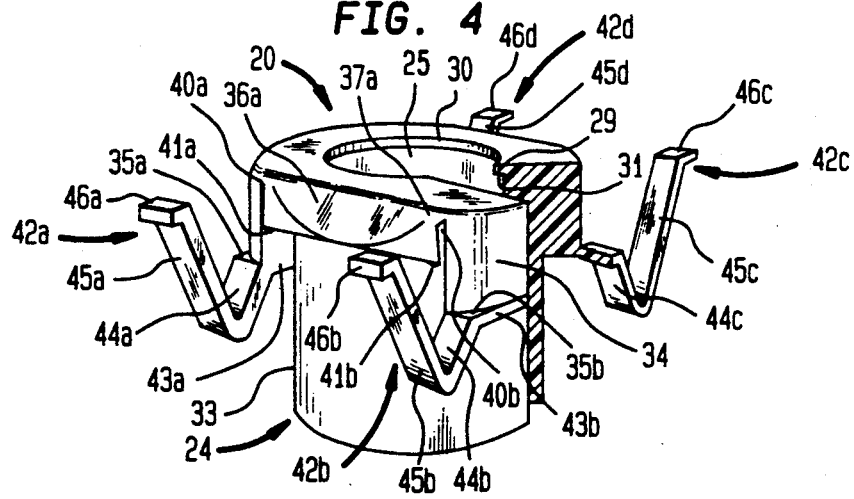

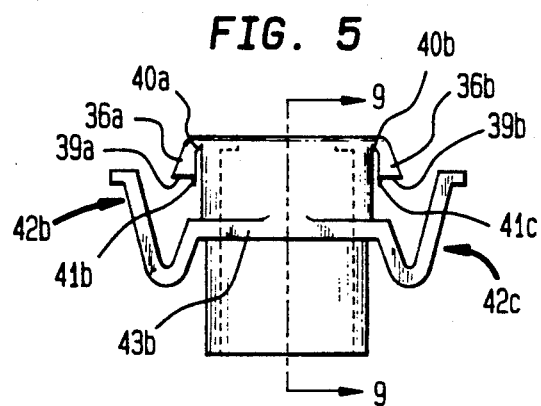
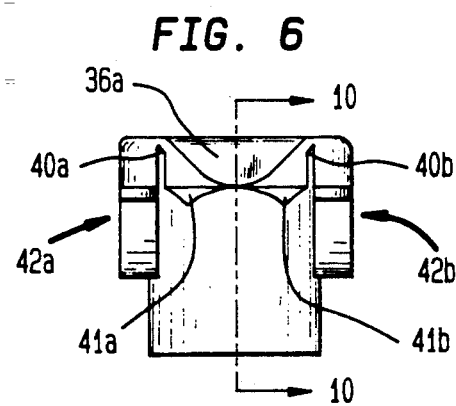
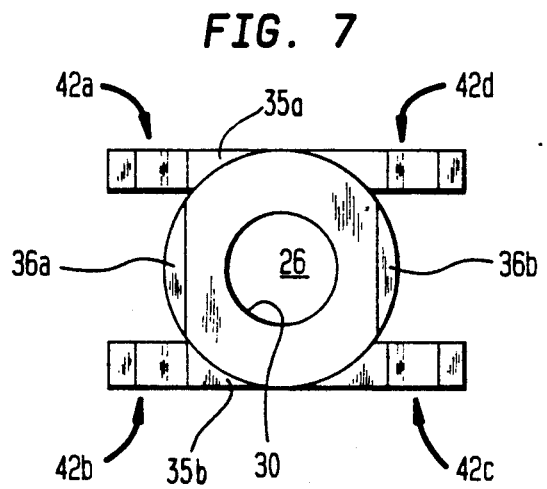
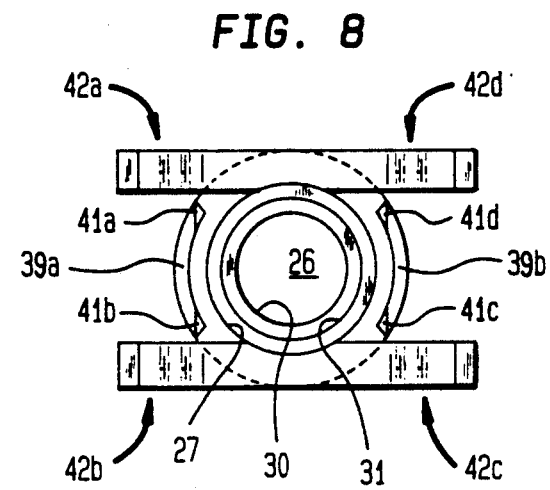
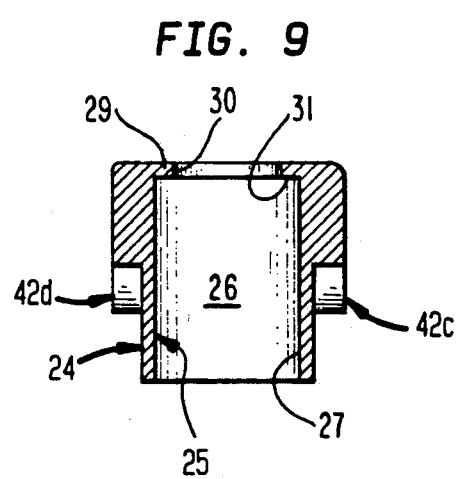
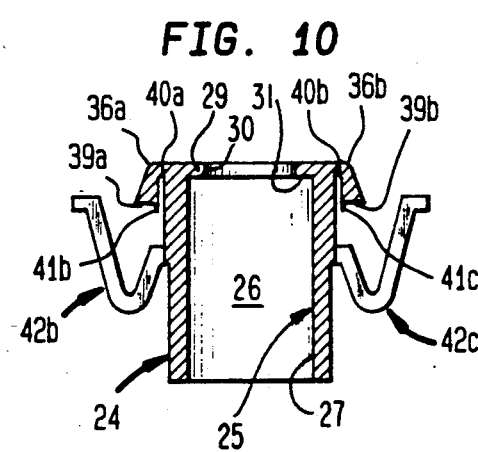

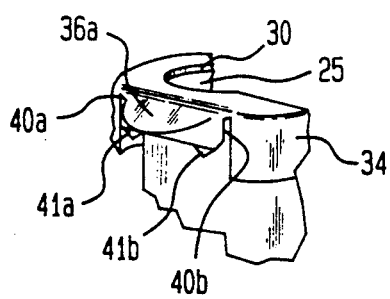
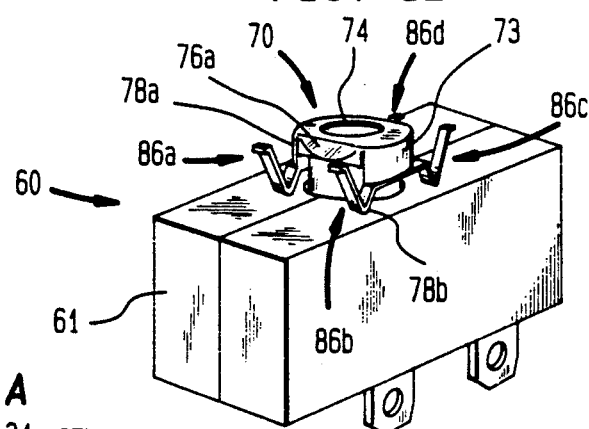
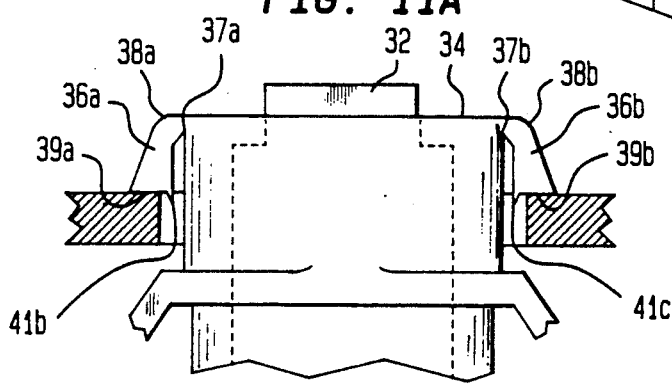
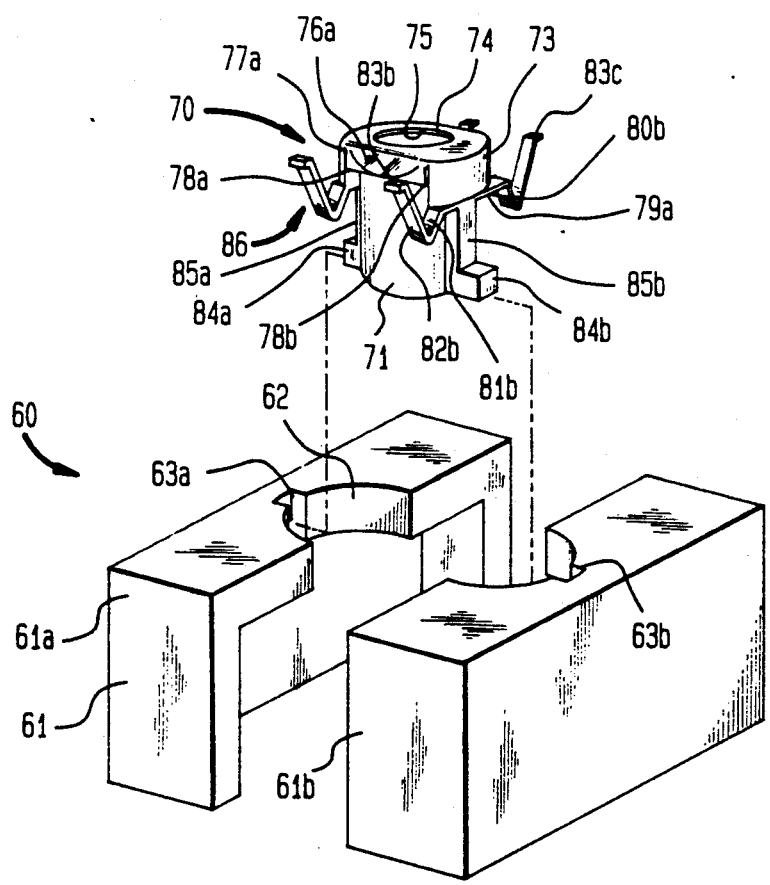

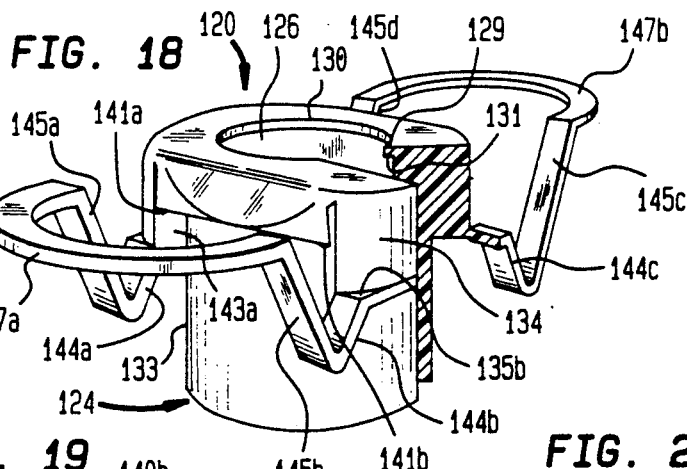
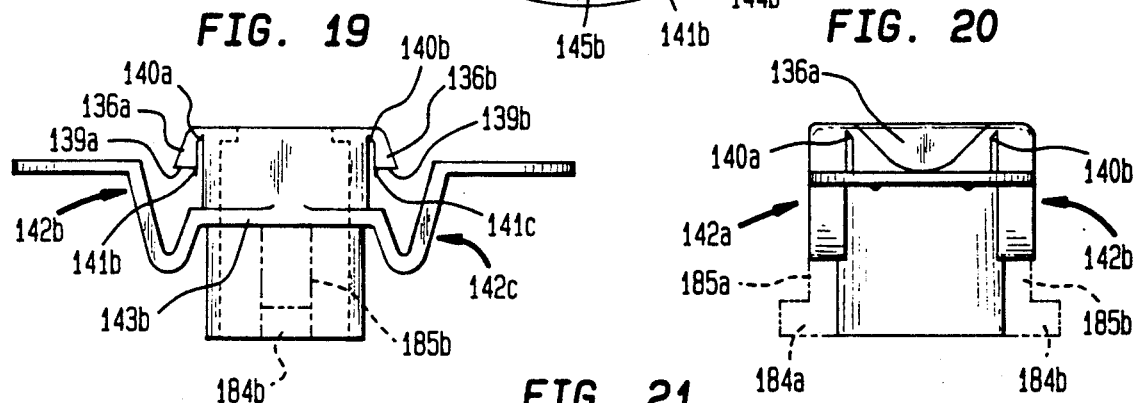
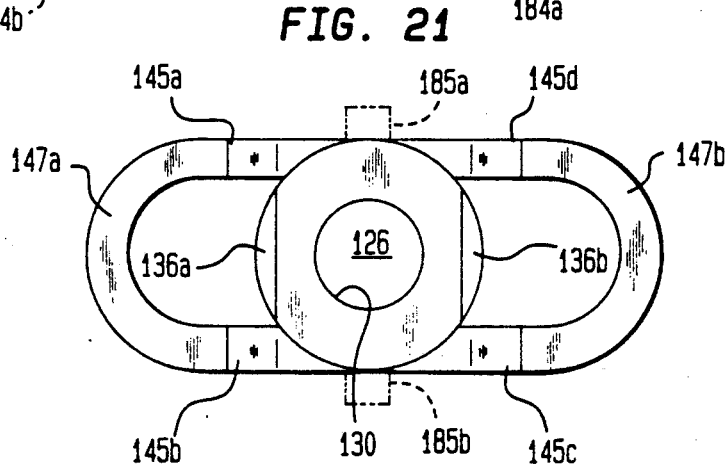
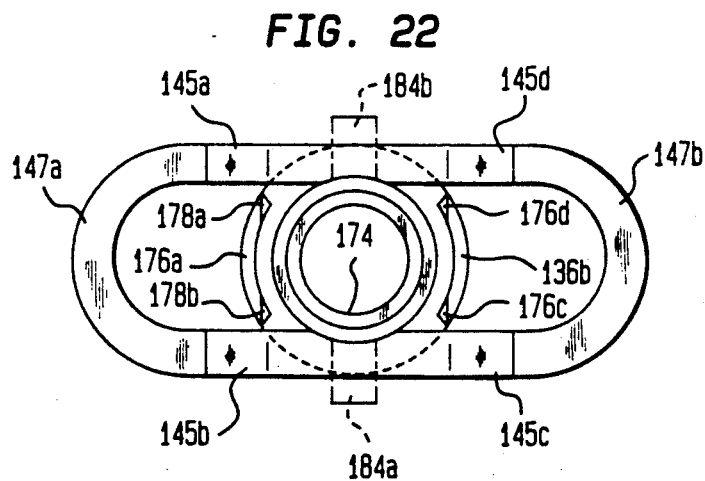

SNAP-IN BRACKET FOR CIRCUIT BREAKER

This invention relates generally to snap-in brackets. More particularly, this invention relates to an improved snap-in bracket adapted to support a circuit breaker in a panel whereby the snap-in bracket includes resilient holding sections and means for preventing deformation of the holding sections and loosening of the snap-in bracket within the panel.

BACKGROUND OF THE INVENTION

Snap-in mounts for supporting electronic components and other devices are generally disclosed in the prior art. This is shown in U.S. Pat. Nos. 4,687,164; 3,941,965; and 3,574,899.

The utility and practicality of snap-in devices for supporting electronic components, switches, fasteners, and other structures has been recognized by those in relevant industries. Due largely to the commercial demand for such snap-in devices, attempts have been made to develop a durable effective device at a low cost.

Thus, in U.S. Pat. No. 4,687,164, a snap-in bushing for supporting an electrical circuit protector in a circular aperture in a mounting panel is disclosed. The disclosed snap-in bushing comprises shoulders designed to sit on top of the panel, and flexible fingers which exert a force upward against the lower face of the panel.

U.S. Pat. No. 3,941,965, discloses a snap-in device for mounting switches and other electronic components in a round hole in a panel. The snap-in device includes a generally tubular means having openings at both ends and being hollow therethrough for acceptance of an electric switch, a flared collar that is radially compressed when it is pressed through a round hole from the back of the panel, and protruding members designed to press against the back of the panel to keep the collar tight against the front of the panel.

In U.S. Pat. No. 3,574,899, a fastener having a central longitudinal aperture for supporting a screw is adapted to be snapped into engagement with a non-circular workpiece aperture. When the fastener is snapped into position in a work aperture, flexible sections compress inward. The fastener deforms as the screw is tightened and the workpiece becomes secure.

The present invention provides an improved snap-in device or bracket for mounting in an opening in a control panel which includes, a sized cylindrical housing adapted to receive or be integrally formed with an electronic component on which cylindrical housing resilient holding means is hingedly connected to compress during the insertion of the snap-in device or bracket into the opening in the control panel and to expand to its original position when the snap-in device or bracket is in assembled position in the control panel, and locking means is operatively associated with the resilient holding means to prevent deformation of the holding means under long term stress conditions or due to the exertion of external forces against the snap-in device or bracket while in the assembled position.

Additionally, the present invention provides the combination with an improved snap-in device or bracket for mounting in an opening in a control panel as above described wherein the resilient holding means in assembled position exerts forces on the upper face of the control panel, and resilient sized and shaped members connected about the medial section of the cylindrical housing a spaced distance from the resilient holding means when the snap-in device or bracket is in assembled position in the control panel, will exert counterforces on the lower face of the control panel to removably fix and maintain the snap-in device or bracket in such assembled position.

These improvements, as disclosed in the present invention, will greatly increase the scope of the use and the life expectancy of the snap-in bracket.

SUMMARY AND OBJECTS OF THE INVENTION

Thus, the present invention pertains to an improved snap-in device or bracket for supporting an electronic component such as a circuit breaker in an opening in a support panel having, a generally cylindrical body including, a sized bore therethrough, resilient holding members hingedly connected to the upper or top portion of the cylindrical body by way of a "living hinge" to enable the holding members to retain their elastic memory, whereby the holding members are disposed to compress during insertion into the opening in the support panel and to expand after insertion to engage the outer face of the panel and exert a downward force thereon, locking tabs operatively associated with the resilient holding members prevent deformation of the holding members due to forces exerted against the snap-in device or bracket in assembled position, and resilient sized and shaped arms connected about the medial section of the cylindrical body at a spaced distance from the holding members, the resilient arms engage the inner face of the support panel and exert an upward counterforce to detachably fix and maintain the snap-in bracket in assembled position.

In an improved snap-in bracket as described above, whereby when the snap-in device or bracket is in assembled position in the opening in the support panel the locking tabs are disposed for operative engagement with the wall of the opening in the support panel thereby exerting sufficient force to prevent deformation of the holding members when external forces are exerted against the exterior of the snap-in device or bracket while in assembled position.

Further, the present invention relates to an improved removable and replaceable snap-in bracket and a circuit breaker formed or fabricated as an integral unit for insertion into an opening in a support panel including, a housing having a sized and shaped aperture with an opening on the outer face of the housing and an opening remote from the outer face of the housing, and slot or groove means disposed within the wall of the sized and shaped aperture and the combination with said slot or groove means of a snap-in bracket having, a generally cylindrical body, resilient holding members so hingedly connected to the cylindrical body as to enable the holding members to be compressed during insertion into the opening in the support panel and in assembled position to engage the outer face of the panel and exert a downward force thereon, locking tabs operatively associated with the resilient holding members, and resilient sized and shaped members connected about the medial section of the cylindrical body at a spaced distance from the holding members, whereby the resilient sized and shaped members are disposed to engage the inner face of the panel and exert a force opposite to the force exerted by the holding members when the integral unit is in assembled position in the support panel.

And still further, the combination as above described wherein the locking tabs are operatively engaged with the wall of the opening in the support panel to exert sufficient force so as to prevent deformation of the holding sections when external forces are applied against the composite and integral snap-in bracket and circuit breaker.

Accordingly, it is an object of the present invention to provide an improved snap-in bracket for supporting a circuit breaker in a panel whereby spaced holding members are connected by "living hinges" to the cylindrical body of the snap-in bracket.

It is another object of the present invention to provide an improved snap-in bracket which utilizes locking tabs for preventing deformation of the spaced holding members on the bracket as a result of excessive forces that may be exerted against the snap-in bracket in assembled position.

It is another object of the present invention to manufacture an improved snap-in bracket in combination with a support panel which is easily insertable with respect to the panel.

It is another object of the present invention to provide an improved snap-in bracket which will remain snug within an opening in the panel.

It is another object of the present invention to provide an improved snap-in bracket in combination with a circuit breaker wherein the snap-in bracket includes a generally cylindrical body having a sized and shaped bore therethrough adapted to receive in friction-fit engagement a sized and shaped neckpiece of the circuit breaker.

It is another object of the present invention to provide an improved snap-in bracket which is commercially desirable and can be produced at a low cost.

It is another object of the present invention to manufacture an improved snap-in bracket which enables the manufacturer to produce and sell the same stock circuit breaker for thread mounted applications and for snap-in mounted applications.

It is another object of the present invention to enable customers to purchase the same stock circuit breakers in large or small quantities for use in either thread mounted or snap-in mounted applications.

It is another object of the present invention to provide an improved snap-in bracket which will enable a standard thread mounted circuit breaker to be adapted to fit into a snap-in bracket by friction-fit or by ultrasonically welding the sized and shaped threaded neckpiece of the circuit breaker through a sized and shaped bore in the snap-in bracket.

It is still another object of the present invention to provide an improved snap-in bracket and a circuit breaker manufactured as an integral unit.

It is still another object of the present invention to provide an improved snap-in bracket and a circuit breaker manufactured as an integral unit which is easily insertable in a support panel.

It is yet another object of the present invention to provide an improved snap-in bracket and a circuit breaker manufactured as an integral unit which can be sold at a low cost.

DESCRIPTION OF THE DRAWINGS

FIG. 1 is a partially exploded side view of a support panel in cross section having an opening therein, a molded unitary snap-in bracket entering the opening with the resilient holding members compressed, and an electronic unit in the form of a reset type circuit breaker having an elongated threaded neck in position for assembly in the snap-in bracket.

FIG. 2 is a side elevational view of the molded unitary snap-in bracket shown in FIG. disposed in assembled position in the opening in the support panel and the circuit breaker in friction-fit engagement or ultrasonically welded into assembled position in the snap-in bracket.

FIG. 3 is a top plan view of the molded unitary snap-in bracket and circuit breaker assembly shown in FIGS. 1 and 2 in assembled position in the opening in the support panel.

FIG. 4 is an enlarged perspective view of the molded unitary snap-in bracket in accordance with the present invention, as shown in FIGS. 1, 2 and 3, partly broken away in vertical section.

FIG. 5 is an enlarged side view of the molded unitary snap-in bracket shown in FIG. 4.

FIG. 6 is an enlarged end view of the molded unitary snap-in bracket shown in FIG. 4.

FIG. 7 is an enlarged top plan view of the molded unitary snap-in bracket shown in FIG. 4.

FIG. 8 is an enlarged bottom plan view of the molded unitary snap-in bracket shown in FIG. 4.

FIG. 9 is a vertical cross-section taken on line 9—9 of FIG. 5.

FIG. 10 is a vertical cross-section taken on line 10—10 of FIG. 6.

FIG. 11 is an enlarged perspective view of a fragment of the molded unitary snap-in bracket showing one of the spaced resilient holding sections and the associated locking tabs.

FIG. 11A is an enlarged perspective view of a molded unitary snap-in bracket in assembled position as shown in FIG. 2 showing the spaced resilient holding members and associated locking tabs in assembled position in the opening and relative to the wall defining the opening in the support panel.

FIG. 12 is an enlarged perspective view of another form of the present invention in which the molded unitary snap-in bracket is formed or fabricated integral with the housing for an electronic component such as a circuit breaker.

FIG. 13 is an enlarged exploded perspective view of the integral and composite snap-in bracket and housing for the electronic component as shown in FIG. 12.

FIG. 18 is an enlarged perspective view of another form of the unitary snap-in bracket in accordance with the present invention.

FIG. 19 is an enlarged side view of the form of the invention shown in FIG. 18.

FIG. 20 is an enlarged end view of the form of the invention shown in FIG. 18.

FIG. 21 is an enlarged top plan view of the form of the invention shown in FIG. 18.

FIG. 22 is an enlarged bottom plan view of the form of the invention shown in FIG. 18.

DESCRIPTION OF DETAILED EMBODIMENT

Figure 14:
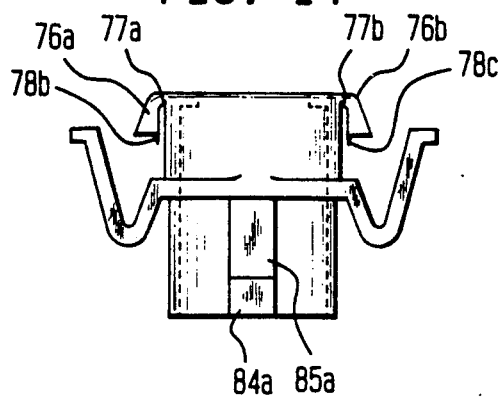
FIG. 14 is an enlarged side view of just the molded unitary snap-in bracket for the form of the invention shown in FIGS. 12 and 13.
Figure 15:
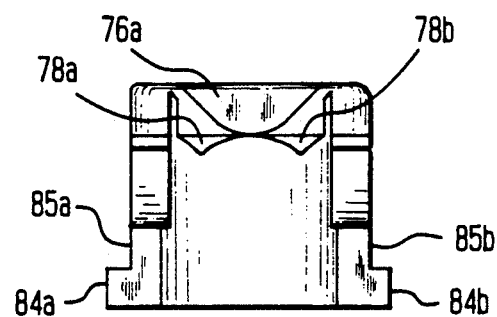
FIG. 15 is an enlarged end view of just the molded unitary snap-in bracket for the forms of the invention shown in FIGS. 12 and 13.
Figure 16:
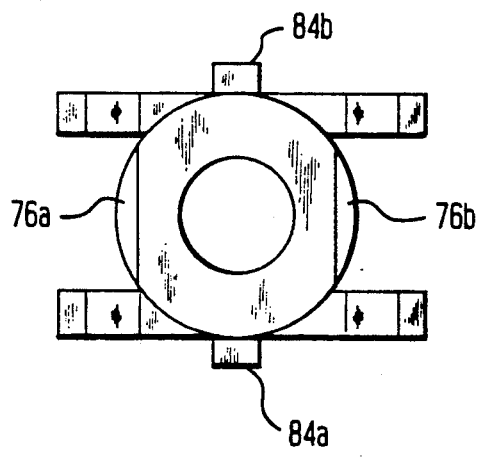
FIG. 16 is an enlarged top plan view of just the molded unitary snap-in bracket for the forms of the invention shown in FIGS. 12 and 13.
Figure 17:
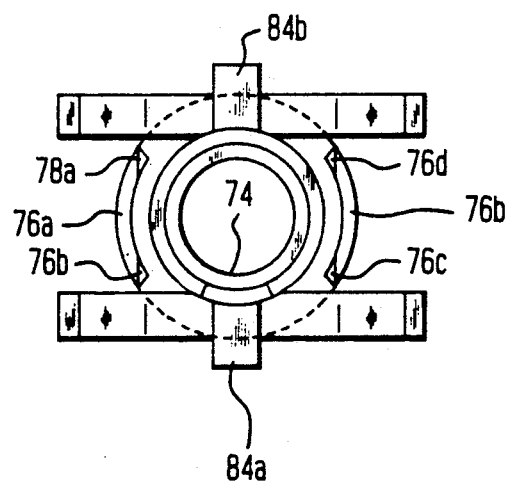
FIG. 17 is an enlarged bottom plan view of just the molded unitary snap-in bracket for the forms of the invention shown in FIGS. 12 and 13.

Referring to the drawings, FIGS. 1–11 show one preferred form of the improved snap-in bracket generally designated 20 in accordance with the present invention. In FIG. 1 the snap-in bracket 20 is shown being assembled into a suitable opening 22 in a housing cabinet or support panel 23 for a plurality of electronic components such as a reset type circuit breaker CB. In FIG. 2 the snap-in bracket 20 is shown in assembled position mounted in the housing cabinet or support panel 23 with the circuit breaker CB mounted therein.

Snap-in bracket 20 in accordance with this form of the invention is preferably formed as a unitary molded member made of plastic or other synthetic material which will permit manufacture by mass production, at low cost and with properties and structure which will enable it to be easily and firmly mounted into assembled position and to receive the circuit breaker CB or other electronic element when in assembled position.

Referring now to FIGS. 3 to 11, the snap-in bracket 20 is shown as a generally annular cylindrical body or housing 24 in which the inner wall 25 forms a sized bore 26 extending end to end therethrough with a lower end opening as at 27, to enable the neck piece 28 of a reset type circuit breaker CB or other electronic component to be mounted therein. Bore 26 is so sized that a friction fit or ultrasonic weld can be formed between the wall of the bore 26 and the neck piece 28 when the circuit breaker CB is mounted in assembled position in the snap-in bracket as is shown in FIG. 2 of the drawings.

At the upper end of the snap-in bracket an inwardly extending flange 29 forms an upper end opening 30 in alignment with the bore 26, which upper end opening 30 has a lesser diameter then the inner wall 25 so that an inner shoulder 31 is formed between the flange 29 and the inner wall 25 just inwardly of the upper end of the snap-in bracket against which the upper end of the neckpiece will abut so that in assembled position the signal and reset member 32 on the neck piece of the reset type circuit breaker CB will be visible and accessible for resetting the circuit breaker when it may be necessary.

About the upper end of the cylindrical body 24 is a collar 34 having a diameter greater than the outer wall 33 of the cylindrical body 24, which collar extends downwardly from the top of the cylindrical body 34 to a point generally medially of the length of the cylindrical body so that it forms with the outer wall 33 spaced outer shoulders as at 35a and 35b on opposite sides of the cylindrical body 24, as is clearly shown in FIG. 4 of the drawings.

FIGS. 2 and 4 also show holding members as at 36a and 36b are hingedly connected as at 37a and 37b to the upper end of the collar 34 on cylindrical body 24.

The holding members 36a and 36b are each shown as having an arcuate outer surface as at 38a and 38b, lower flat surfaces as at 39a and 39b, and they are of a lesser thickness then the collar 34. By reason of their hinged connection to collar 34 the holding member can be compressed inwardly to enable the snap-in bracket to be assembled into the opening 22 in the support panel 23 in the manner shown in FIG. 1 and to expand or snap outwardly when fully assembled as shown in FIG. 2 so that the lower flat surfaces 39a and 39b will engage with the outer face 23a of housing cabinet 23 and in assembled position to exert a force on the outer face of the housing cabinet or support panel 23.

To facilitate the assembly, the holding members 36a and 36b are beveled at the opposite side edges as at 40a and 40b for holding member 36a and at 40c and 40d for holding member 36b.

Those skilled in the art will recognize that if the snap-in bracket is made from a suitable plastic or synthetic material having a memory the hinged connections will have the characteristics of a "living hinge" and permit substantial physical usage of the snap-in bracket because the holding members by reason of the memory characteristics of the material will return to their respective original position after deformation, thus permitting prolonged compression and expansion of the holding members 36a and 36b as above described for the positioning of the snap-in bracket in assembled position for use.

Additionally, although one type of shaped opening in the support panel 23 is illustrated, those skilled in the art will readily recognize that the opening may have any desired shape and the snap-in bracket can in turn be so shaped that the holding members can fit the particular shape of the opening, without departing from the scope of the present invention.

In order to prevent deformation which may injure the holding members if excessive force is exerted against the upper end or exterior face of the snap-in bracket 20 when it is in assembled position, locking tabs as at 41a and 41b are formed as a continuous extension of the beveled side edges 40a and 40b for holding member 36a and 41c and 41d as a continuous extension of the beveled side edges 40c and 40d for holding member 36b. Further, by reference to FIGS. 2, 4, 5, 10 and 11 it will be noted that when the snap-in bracket is in assembled position in the opening 22 in the panel 23 that the locking tabs 41a, 41b and 41c and 41d remain in engagement with the walls of the opening 22 in the housing cabinet or support panel 23. If forces are exerted against the exterior face of the snap-in bracket, while it is in this assembled position as is shown in FIG. 2, the locking tabs will limit the degree of deformation and prevent unacceptable spreading or breaking of holding members 36a and 36b. This is also illustrated in more detail at FIG. 11. FIG. 11A shows locking tabs 41b and 41c in engagement with the wall of the opening 22 when the snap-in bracket 20 is in assembled position in the support panel 23.

Operatively associated with the holding members as hereinafter more fully described are four resilient fingers 42a, 42b, 42c and 42d which extend from and are connected to the spaced outer shoulders 35a and 35b formed by the collar 34 and the outer wall 33 of the cylindrical member 24 of the snap-in bracket 20.

Each of the four resilient fingers 42a, 42b, 42c and 42d includes respectively, a portion of elongate members 43a or 43b, downwardly extending members 44a, 44b, 44c and 44d, upwardly extending members 45a, 45b, 45c and 45d, and planar ends 46a, 46b, 46c and 46d. Resilient fingers 42a, 42b, 42c and 42d are medially disposed on the cylindrical body 24 by reason of their attachment to the respective shoulders 35a or 35b. More specifically, the elongate members 43a and 43b of the respective resilient fingers are continuous with shoulders 35a and 35b. Members 43a and 43b are generally parallel to each other and, as illustrated in FIG. 4, share the same general horizontal plane. Those skilled in the art will readily recognize that while members 43a and 43b are shown parallel and in the same plane that other configurations can be used without departing from the scope of the present invention.

Downwardly extending members 44a and 44d; 44b and 44c respectively, are spaced from each other and are connected at one end to respective opposite ends of elongate members 43a and 43b. Upwardly extending members 45a, 45b, 45c and 45d, in turn are connected to the outer most ends of the respective downwardly extending members 44a, 44b, 44c and 44d, respectively, forming a v-shaped connection which by reason of the material and their relative thickness will allow for some return of the elastic extension and return of the resilient fingers 42a, 42b, 42c and 42d to the normal position as shown in FIGS. 1, 2, 4, 5, 6, 7 and 8 of the drawings.

Upwardly extending members 45a, 45b, 45c and 45d, are longer than downwardly extending members 44a, 44b, 44c and 44d, thereby enabling each of the four planar ends 46a, 46b, 46c and 46d, which are attached to the upper most point of upwardly extending members 45a, 45b, 45c and 45d, to be positioned at a predetermined spaced distance below holding members 36a and 36b for engagement with the inner surface of the support panel 23 when the snap-in bracket 2 is assembled into the opening 22 in the support panel 23.

Each of the four planar ends 46a, 46b, 46c and 46d, as illustrated in FIG. 4, share the same general horizontal plane and are also disposed generally parallel to each other so that in assembled position they exert substantially uniform counterforces outward to the inward forces exerted by the holding members 36a and 36b which counterforces act to hold and maintain the snap-in bracket in assembled position in the opening 22 in panel 23.

OPERATION

The present invention provides an improved snap-in bracket 20, in which the top end can be forced through opening 22 in a support panel 23, the holding members 36a and 36b being compressed so as to pass through opening 22 and after passing through the opening 22 expand so that the lower faces 39a and 39b of the holding members 36a and 36b rest on the outer face 23a of panel 23.

In this assembled ,position, members 36a and 36b will exert inward forces upon outer face 23a of panel 23, and the planar ends 46a, 46b, 46c and 46d forming the outer most portion of resilient fingers 42a, 42b, 42c and 42d, will exert outward forces upon the inner face 23b of panel 23, these counterforces acting to detachably fix and maintain the snap-in bracket 20 in assembled position in the opening 22 in the support panel 23.

After the snap-in bracket is in assembled position as above described, any electronic component such as circuit breaker CB having, a body and a neckpiece 28, can be friction-fitted or ultrasonically welded into the bore 26 of the snap-in bracket 20. The bore 26 extending through cylindrical body 24 and defined by inside wall 25, is sized and shaped so the electronic component can be press-fitted as for example engagement by neckpiece 28 of circuit breaker CB into assembled position. FIG. 2 illustrates snap-in bracket 20 in assembled position in opening 22 in panel 23 with circuit breaker CB friction-fitted or ultrasonically welded into assembled position in snap-in bracket 20.

When in assembled position, the frictional forces or ultrasonic welds between neckpiece 28 of circuit breaker CB and the inside wall 25 of cylindrical body 24 will hold circuit breaker CB indefinitely in assembled position. As illustrated in FIG. 2, the shoulder on neckpiece 28 is restricted by, and in contact with, shoulder 31 formed by inwardly extending flange 29. Reset button 32 extends through upper opening 30 remaining visible and accessible to signal an open circuit condition.

By assembly of the improved snap-in bracket 20 and an associate electronic component as above described, a technician of ordinary skill will be able to wire the leads of circuit breaker CB into the circuit while circuit breaker CB is in a convenient location to complete the wiring, and subsequently the now wired circuit breaker CB and snap-in bracket 20 can be assembled together, where it would have been otherwise awkward to get access to the housing cabinet or support panel for such wiring purposes.

Improved snap-in bracket 20 is thus capable of use with most standard circuit breakers having the conventional threaded neckpiece, by simple manual pressure to form a friction fit connection of the neckpiece into assembled position in the snap-in bracket as above described, thereby enabling circuit breaker CB to accommodate snap-in mounting needs of customers. Conversely, customers can purchase the same conventional stock part for both threaded mounting and snap-in mounting applications.

Manufacturers of circuit breakers with threaded necks will also benefit as they can sell the same stock part to customers regardless of the mounting application required by the customer. Accordingly, both manufacturing and purchasing costs can be kept at a minimum.

It will be understood by those skilled in the art that while reference has been made to electronic components with threaded neckpieces, that electronic components with smooth walled neckpieces can also be sized and shaped to fit the bore 26 of the snap-in bracket as may be required or ordered by the customers. Such components can also be manually assembled and held in assembled position in bore 26 by friction-fit engagement or by ultrasonic welding.

In FIG. 1, improved snap-in bracket 20 is illustrated as it is being squeezed through opening 22 in panel 23. Holding members 36a and 36b are shown in a compressed state as they are forced through opening 22. Planar ends 46a, 46b, 46c and 46d, on the resilient fingers 42a, 42b, 42c and 42d, are shown flush against inner face 23b of panel 23 when snap-in bracket 20 is not yet completely in assembled position. As is evident from FIG. 2, once snap-in bracket 20 is in assembled position in opening 22 of the support panel 23, holding members 36a and 36b will be in contact with and exert forces against outer face 23a. Planar ends 46a, 46b, 46c and 46d in assembled position will exert outward forces against the inner face 23b, however, they are no longer flush against lower face 23b since the forces exerted upon the downward extending members 44a, 44b, 44c and 44d and upward extending members 45a, 45b, 45c and 45d of the resilient fingers cause them to spread apart thereby extending the v-shaped connection between them.

In the assembled position for snap-in bracket 20, the locking tabs 41a, 41b, 41c and 41d extend downwardly into opening 22 as also shown in FIGS. 2, 11 and 11A. Further, from the side view of snap-in bracket 20 shown in FIG. 5, 11 and 11A two of the locking tabs 41b and 41c can be seen extending off holding members 36a and 36b. Thus, although holding members 36a and 36b are disposed so that the flat lower faces 29a and 29b engage the outer face 23a of panel 23, when snap-in bracket 20 is in assembled position, locking tabs 41a, 41b, 41c and 41d, on holding members 36a and 36b will be disposed within opening 22 in panel 23 and the outer beveled edge of locking tabs 41a, 41b, 41c and 41d engage the wall of opening 22.

When forces are exerted on the exterior or upper end of the cylindrical body 24 of the snap-in bracket 20, holding members 36a and 36b will tend to spread out. Without the locking tabs 41a, 41b, 41c and 41d, ordinary forces even under short term use, would over time affect the resiliency of the "living hinges" 37a and 37b and affect the elastic memory, for returning holding members 36a and 36b to their normal engaged position once the forces are removed. When holding members 36a and 36b lose this elastic memory, they become permanently deformed and as a result snap-in bracket 20 would no longer remain snug within opening 22 and would fail and escape from assembled position and thus be rendered useless.

However, improved snap-in bracket 20 as disclosed herein, is designed to prevent such permanent deformation because locking tabs 41a, 41b, 41c and 41d, remain inside opening 22 in panel 23 when the snap-in bracket 20 is in assembled position. When external forces are then exerted against the upper end of the snap-in bracket 20, locking tabs 41a, 41b, 41c and 41d, exert forces upon the wall of opening 22 in panel 23, thereby counteracting the external forces before they are transferred to holding members 36a and 36b, thus preventing the external forces from causing holding members 36a and 36b to permanently deform, all of which is shown in FIGS. 2, 11 and 11A of the drawings.

The perspective view of the fragment of snap-in bracket 20 illustrated in FIGS. 11 and 11A clearly show locking tabs 41a and 41b formed on holding member 36a, extending beneath member 36a a predetermined spaced distance so they will be automatically positioned for engagement with the wall of the opening 22 in the support panel 23 after the snap-in bracket 20 is inserted into assembled position through opening 22 of the support panel 22 as has been above described.

Locking tabs 41a, 41b, 41c and 41d, in combination with the "living hinges" 37a and 37b for the holding members 36a, 36b, constitute an improvement upon prior art brackets enabling the improved snap-in bracket 20 in accordance with the present invention to retain its form and function and continue to be effective for its intended purpose even after exposure to such external forces.

ANOTHER PREFERRED EMBODIMENT

FIGS. 12 through 17 illustrate a further form of the present invention in which the snap-in bracket portion 70 is integrated with the housing 61 of an electronic component such as a circuit breaker and together therewith forms an integral snap-in device or unit 60. With the exception of rectangular stops 84a and 84b and the vertical supports 85a and 85b, illustrated in FIGS. 13 through 18, all parts of the snap-in bracket portion 70 of integral unit 60 are identical in structure and function to the corresponding parts of the first preferred form of snap-in bracket 20 illustrated in FIGS. 1 through 11 and described above.

Rectangular stops 84a and 84b as illustrated in FIG. 14 are disposed on diametrically opposing sides of the bottom end of cylindrical body 71 and appear perpendicular to body 71. Rectangular stops 84a and 84b are not visible when integral unit 60 is in assembled form. They serve as locators and physical restraints for positioning and preventing movement of snap-in bracket portion 70 within housing 61 during manufacture of integral unit 60.

In the exploded perspective view of integral, snap-in device or unit 60 shown in FIG. 13, housing 61 formed by two matching halves 61a and 61b has a sized and shaped aperture 62 for receiving and for connection of snap-in bracket portion 70 during the manufacture of integral unit 60. Sized and shaped grooves 63a and 63b are cut into the wall of aperture 62 and when the housing halves 61a and 61b are assembled receive rectangular stops 84a and 84b, as well as vertical supports 85a and 85b, of snap-in bracket portion 70 and prevent snap-in bracket portion 70 from moving within housing 61.

Once snap-in bracket portion 70 is manufactured with housing 61 to form integral unit 60 with the circuit breaker, snap-in bracket portion 70 is not free to move within housing 61.

Integral unit 60 has all the advantages of the combination effect of "living hinges" 77a and 77b between holding members 76a, 76b and collar 73, and locking tabs 78a, 78b, 78c and 78d, thereby enabling holding members 76a and 76b to retain their shape and elastic memory without the problem of deformation due to outside forces, as above described for the form of the invention shown in FIGS. 1 to 11 of the drawings plus the advantage of reduced cost because snap-in bracket portion 70 and housing 61 for the electronic component such as the circuit breaker illustrates can be sold commercially in one package.

Those skilled in the art will readily appreciate that the portion of the mechanical structure serving as an interconnection means between snap-in bracket portion 70 and housing 61 as described herein, is just one method of creating the integral unit 60. Many combinations of structural arrangements for mechanically connecting snap-in bracket portion 70 and housing 61, molding or other fabricating methods can be used to produce a single integral unit.

In operation, the leads emanating from integral unit 60 can be wired into a circuit at a location permitting a technician of ordinary skill to conveniently wire integral unit 60 into the circuit. After the electrical connections are complete and as long as the length of the wiring arrangement permits, integral unit 60 can then be snapped into assembled position in a housing cabinet or support panel in a manner identical to that described above for placing the improved snap-in bracket 20 of the first embodiment of the present invention into assembled position.

A THIRD PREFERRED EMBODIMENT

FIGS. 18 through 22 illustrate a third form of the present invention, which is virtually identical to the form of the invention illustrated in FIGS. 1 through 11. This third embodiment differs however by the addition of transverse support member 147a, which is formed between resilient fingers 142a and 142b, and transverse support member 147b is formed between resilient fingers 142c and 142d whose function and purpose is hereinafter more fully described.

As illustrated in FIGS. 18 through 22, transverse support member 147a is connected between or formed integrally with planar ends 146a and 146b of resilient fingers 142a and 142b thereby connecting those resilient fingers together. Similarly, transverse support member 147b is molded between planar ends 146c and 146d of resilient fingers 142c and 142d thereby attaching those resilient fingers.

Transverse support members 147a and 147b serve to provide additional strength and support to resilient fingers 142a, 142b, 142c and 142d when in assembled position within a panel.

Those skilled in the art will readily appreciate that the size and shape of support members 147a and 147b, which connect resilient fingers 142a to 142b and 142c to 142d, can be varied and still produce the same strengthening effect for the intended use of the snap-in bracket.

It will be understood from the description of the composite and integral form of the snap-in bracket and electronic component as shown at FIGS. 12 to 17 of the drawings, that the snap-in bracket as shown in FIGS. 18 to 22 of the drawings can be modified to provide the rectangular stops and vertical supports as shown by the phantomized dotted lines at 184a and 184b for the rectangular stops and 185a and 185b for the vertical supports in FIGS. 19, 20, 21 and 22 of the drawings so that this modified form of the snap-in bracket can also be adapted for this purpose.

While the foregoing description illustrates various preferred embodiments of apparatus and systems in accordance with the present invention, it will be appreciated that certain changes and modifications may be made in the structure of these disclosed arrangements without departing from the spirit and scope of the invention and that the same is defined by the claims as hereinafter set forth.

What is claimed is:

1. A molded unitary snap-in bracket for supporting a circuit breaker in a support panel having an inner face and an outer face and a sized and shaped opening defining a cylindrical wall therein comprising:
   a a generally cylindrical body having an outer wall and a sized bore extending end to end therethrough forming an inner wall in said cylindrical body, said sized bore having, a top opening at one end of the cylindrical body and a bottom opening at the opposite end remote from said top opening,
   b spaced resilient holding members hingedly connected on opposite sides of said cylindrical body disposed to fit into the sized and shaped opening in said support panel and having a surface engaging face disposed in assembled position to engage and exert a force against the outer face of the support panel about the sized and shaped opening therein,
   c locking tab means disposed continuous with the surface engaging face of the respective resilient holding member disposed to engage the cylindrical wall defined by said sized and shaped opening in the support panel to prevent deformation of the respective resilient holding members when the snap-in bracket is in assembled position therein, and
   d resilient sized and shaped arms connected medially along said cylindrical body a predetermined spaced distance from the spaced resilient holding members disposed to engage the inner face of the support panel about the opening therein so as exert a force against the inner face of the support panel opposite to that of the resilient holding members for operative co-action therewith to hold and maintain the snap-in bracket in assembled position in the support panel.

2. A molded unitary snap-in bracket as claimed in claim 1 including, a collar formed about the generally cylindrical body inwardly of the top opening and extending downwardly along the outer wall of said cylindrical body at least a portion of the length thereof, said collar having a shoulder thereon, said resilient sized and shaped arms are connected to said shoulder on opposite sides of said cylindrical body.

3. The combination of a unitary snap-in bracket as claimed in claim 2 with an electronic component having a neckpiece thereon whereby said neckpiece is sized and shaped to be connected into the sized bore of said snap-in bracket to connect the electronic component into assembled position.

4. A unitary snap-in bracket as claimed in claim 2, wherein:
   a said spaced resilient holding members include, a living hinge connected to the collar means formed about the top opening of said cylindrical body,
   b said locking tab means formed on said spaced resilient holding members include, an inwardly slanted inner portion for insertion into the sized and shaped opening in a support panel, and beveled outer edges disposed to engage the wall of the sized and shaped opening to prevent spreading and permanent deformation of said holding members, and
   c said resilient sized and shaped arms include, two generally elongate members each having a first end and a second end facing upward whereby when the snap-in bracket is in assembled position in the support panel said first end and said second end of the two generally elongate members are in engagement with the inner face of the support panel.

5. The combination of a molded unitary snap-in bracket as claimed in claim 4 and a circuit breaker having a neckpiece thereon whereby said neckpiece is sized and shaped to be connected into the sized bore of said snap-in bracket to connect the circuit breaker into assembled position.

6. A unitary snap-in bracket as claimed in claim 4, further comprising at least one transverse support member fixedly attached between said resilient sized and shaped arms to provide additional strength and support to said resilient sized and shaped arms when the snap-in bracket is in assembled position within the panel.

7. In the unitary snap-in bracket as claimed in claim 6 wherein, said locking tab means are disposed for operative engagement with the wall of said sized and shaped opening in said support panel.

8. A molded unitary snap-in bracket as claimed in claim 1 wherein the locking tab means has, an inwardly slanted inner portion for insertion with the resilient holding member into the sized and shaped opening in said support panel, and beveled outer edges disposed to engage the wall of the sized and shaped opening when the snap-in bracket is in assembled position to prevent spreading and permanent deformation of said holding members.

9. The combination of a molded unitary snap-in bracket as claimed in claim 1 with an electronic component having a neckpiece thereon wherein said neckpiece is sized and shaped to be connected into said sized bore of said snap-in bracket to connect the electronic component into assembled position.

10. A snap-in bracket and a circuit breaker manufactured as an integral unit for insertion into a sized and shaped opening defining a cylindrical wall in a support panel having an inner face and an outer face comprising:

a a housing for said circuit breaker having, a top side, said top side having a wall defining a sized and shaped circular aperture, b a bracket having means for connecting the integral unit into an assembled position in the support panel, wherein said bracket includes;

i a generally cylindrical body having an outer wall and a sized bore extending end to end therethrough forming an inner wall in said cylindrical body, said sized bore having a top opening in one end of said cylindrical body and a bottom opening at the opposite end remote from said top opening, ii spaced resilient holding members hingedly connected on opposite sides of said cylindrical body movable to fit into the sized and shaped opening in said support panel and having a surface engaging face disposed when said snap-in bracket is fitted into the sized and shaped opening in said support panel to engage and exert a force against the outer face of the support panel about the sized and shaped opening therein, iii locking tab means disposed continuous with the surface engaging face of the respective resilient holding member and to engage the cylindrical wall defined by said sized and shaped opening in the support panel to prevent deformation of the respective resilient holding members when the snap-in bracket is in assembled position therein, and iv resilient sized and shaped arms connected medially along said cylindrical body a predetermined spaced distance from the spaced resilient holding members disposed in assembled position to engage the inner face of the support panel about the sized and shaped opening therein and to exert a force opposite to that of the resilient holding members for operative co-action therewith to hold and maintain the integral unit in assembled position in the support panel, and v stop tabs protruding from opposite sides of the bottom end of said generally cylindrical body, and c spaced slots in the wall of the sized and shaped circular aperture, d said stop tabs disposed for operative engagement with the spaced slots within the wall of the housing.

11. An integral unit as claimed in claim 10 including, a collar formed about the top opening of the generally cylindrical body and extending downwardly along opposing sides of the outer wall of said cylindrical body, said collar having a diameter greater than the outer wall of such cylindrical body to form a shoulder therewith, said resilient sized and shaped arms are connected to said shoulder by said collar means.

12. An integral unit as claimed in claim 11, wherein:

a said spaced resilient holding members include, a living hinge connected to the collar formed about the top opening of said cylindrical body, b said locking tab means formed on said spaced holding members include, an inwardly slanted inner portion, and beveled outer edges, said beveled outer edges disposed to engage the wall of the sized and shaped opening when said integral unit is in assembled position to prevent spreading and permanent deformation of said holding members, and c said resilient sized and shaped arms include, two generally elongate members each having a first end and a second end facing upward and positioned whereby when the integral unit is in assembled position in the support panel to exert a force upon the inner face of the support panel opposite to that of the resilient holding members.

13. In the integral unit as claimed in claim 12 whereby, said locking tab means are disposed for operative engagement with the wall of said sized and shaped opening in said support panel.

* * * * *

UNITED STATES PATENT AND TRADEMARK OFFICE
CERTIFICATE OF CORRECTION

PATENT NO. : 5,146,056
DATED : September 8, 1992
INVENTOR(S) : Robert A. Kucynski It is certified that error appears in the above-indentified patent and that said Letters Patent is hereby corrected as shown below:

```
column 4, line 5, "FIG." should read --Fig. 1--.

column 7, line 24, "2" should read --20--.
         line 45, delete "," first occurrence.

column 8, line 53, after "exert" insert --inward--.
```

Signed and Sealed this

Fourteenth Day of September, 1993

Attest:

BRUCE LEHMAN

Attesting Officer     Commissioner of Patents and Trademarks